(12) United States Patent  (10) Patent No.: US 7,527,324 B1
Clonan  (45) Date of Patent: May 5, 2009

(54) UNIVERSAL RAIL SYSTEM FOR VEHICLES

(76) Inventor: Richard S. Clonan, 2070 Glenwood Rd., Cazenovia, NY (US) 13035

( * ) Notice: Subject to any disclaimer, the term of this patent is extended or adjusted under 35 U.S.C. 154(b) by 0 days.

(21) Appl. No.: 12/205,120

(22) Filed: Sep. 5, 2008

Related U.S. Application Data

(62) Division of application No. 11/449,550, filed on Jun. 8, 2006.

(60) Provisional application No. 60/688,649, filed on Jun. 8, 2005.

(51) Int. Cl.
*B62D 33/02* (2006.01)

(52) U.S. Cl. ............... 296/183.1; 296/43; 296/37.6

(58) Field of Classification Search ............ 296/183.1, 296/37.6, 24.44, 24.45, 3, 43, 26.09; 224/405; 312/334.5; 211/162
See application file for complete search history.

(56) References Cited

U.S. PATENT DOCUMENTS

| | | | |
|---|---|---|---|
| 2,494,221 A | 1/1950 | Wojakowski | |
| 3,826,529 A | 7/1974 | Wood | |
| 4,522,326 A | 6/1985 | Tuohy, III | |
| 4,527,827 A | 7/1985 | Maniscalco et al. | |
| 5,088,636 A | 2/1992 | Barajas | |
| 5,301,995 A | 4/1994 | Isler | |
| 5,310,255 A * | 5/1994 | Ranallo | 312/334.5 |
| D350,107 S | 8/1994 | Ramaciotti | |
| 5,365,994 A | 11/1994 | Wheatley et al. | |
| 5,385,377 A | 1/1995 | Girard | |
| 5,393,114 A | 2/1995 | Christensen | |
| 5,454,612 A | 10/1995 | Christensen | |
| 5,988,722 A * | 11/1999 | Parri | 296/26.09 |
| 6,116,673 A * | 9/2000 | Clonan | 296/37.6 |
| 6,431,668 B1 * | 8/2002 | Reddicliffe | 312/334.5 |
| 7,017,966 B2 | 3/2006 | Clonan | |

OTHER PUBLICATIONS

The Woodworkers' Store, Catalog C-94, Received Jan. 22, 1997, p. 16, "Adjustable Shims for Blum Slides".

* cited by examiner

*Primary Examiner*—Dennis H Pedder
(74) *Attorney, Agent, or Firm*—Burr & Brown

(57) ABSTRACT

A universal rail system for a vehicle having a bed is provided, including at least first and second rails adjustably affixed to a respective one of the opposed sidewalls of the vehicle bed. The rails extend proximate an inner surface of the sidewalls in the longitudinal direction between a front wall of the vehicle bed and a tailgate thereof, and each rail includes at least one elongated channel extending along a longitudinal direction thereof. Mounting means are provided, associated with each rail, to adjustably affix the rails to the sidewalls. The mounting means is adapted to cooperate with the rails to adjustably compensate for a degree that the sidewalls deviate from a parallel alignment position along the longitudinal direction between the front wall and the tailgate of the vehicle bed so that the rails have a substantially parallel relationship with respect to one another in the longitudinal direction.

11 Claims, 9 Drawing Sheets

UNIVERSAL RAIL SYSTEM FOR VEHICLES

CROSS-REFERENCE TO RELATED APPLICATIONS

This application is a divisional of U.S. patent application Ser. No. 11/449,550, filed Jun. 8, 2006, which claims the benefit of U.S. Provisional Patent Application Ser. No. 60/688,649, filed on Jun. 8, 2005, the entireties of which are incorporated herein by reference.

FIELD OF THE INVENTION

The present invention relates to a universal rail system for mounting translocatable accessory units in the bed of a vehicle having an open load carrying section defined between a pair of sidewalls that are either parallel with respect to one another or which deviate from a parallel alignment position at an angle defining a taper along the longitudinal length of the sidewalls between the tailgate of the vehicle bed and the front wall thereof.

BACKGROUND OF THE INVENTION

Systems for slidably mounting exterior vehicle accessories in the beds of pickup trucks or other vehicles having open beds are known. For example, in U.S. Pat. No. 6,116,673, the present Inventor disclosed a slide rail system that is mounted on the upper surface, and partially on an inner surface, of the sidewalls of a vehicle bed by which accessories, such as tool storage boxes or the like, are slidably mounted. The system includes a pair of L-shaped rail support members including a horizontal flange that is placed upon one of the sidewalls and the vertical flanges are placed in parallel alignment inside the bed. The rails are suspended from the parallel vertically disposed flanges and the accessory is slidably contained between the rails upon rollers.

There is room, however, as well as a need for improving prior art slide rails systems. One troublesome area associated with known slide rail systems lies in the top-mounted nature of the design. The required mounting structure necessarily obscures the stake pockets that are typically provided as a standard feature in the sidewalls of vehicle bed. When these stake pockets are obscured by the slide rail system, other accessories cannot be mounted in those stake pockets, which limits the accessory options that are available. In addition, it is not possible to install other commonly desired top-mounted accessories, such as caps, tonneau covers and ladder racks, for instance, when the slide rail system of the '673 patent is installed as described without otherwise first removing the slide rail system.

There is also room to improve the way in which the rails of the slide system are mounted and configured so as to compensate for the degree of taper (or the angle at which the sidewalls deviate from being parallel with the longitudinal axis of the vehicle bed) in order to facilitate the sliding translocation of accessories within the vehicle bed. While the systems of the '673 patent address this problem, these slide rails are typically custom built according to particularly known degrees of taper to provide a specifically tailored parallel rail system therefor. In practice, different rail system models having different taper compensation configurations need to be provided on vehicles made by different manufacturers whose bed sidewalls have different signature taper specifications. While the prior art rail systems may be individually useful in association with a particular vehicle bed having a corresponding degree of taper, a great deal of time and precision are still required to measure and obtain the appropriately corresponding and compensating angles required to actually mount and secure the rails in proper parallel alignment.

SUMMARY OF THE INVENTION

The universal rail system according to the present invention offers significant structural and functional improvements over the existing '673 system. The improvements afforded by the universal rail system of the present invention, as described in detail herein below, provide easier and faster mounting and alignment of the rails, provide ready access to stake pockets and allow for the installation and use of additional top-mounted accessories without having to remove the rail system from the vehicle bed. In addition, the universal rail system according to the present invention enables a number of separate accessories to be slidably mounted on more than one track on each of the rails.

One object of the present invention is to provide a universally applicable rail system for slidably supporting and translocating accessory units within a vehicle bed that is self-adjustable to compensate for any degree of parallel divergence or taper that may exist between the sidewalls of the vehicle bed. Another object of the present invention is to provide a universal rail system that can be quickly installed and easily adjusted to achieve the desired transverse and longitudinal spatial relationship between the rails on vehicle beds to effectively accommodate slidably mounted accessory units. A further object of the present invention is to provide a universal rail system which, when mounted in a vehicle bed, does not obscure the stake pockets or other openings provided in the sidewalls of the vehicle bed, and which instead allows for concurrent installation and utilization of additional top-mounted accessory units. Yet another object of the present invention is to provide a universal rail system that includes a plurality of channels for slidably mounting a number of different accessories on one rail system within the vehicle bed in a cooperative manner so that the different accessories do not interfere with one another.

According to one embodiment of the present invention, a universal rail system is provided for a vehicle having a bed defined at least in part by a front wall proximate a passenger cab of the vehicle, a tailgate distal from the front wall and a pair of opposed sidewalls, having one of a parallel relationship and a degree of taper with respect to one another, extending between the front wall and the tailgate. The universal rail system comprises at least first and second rails affixed to a respective one of the sidewalls and extending proximate an inner surface of the respective sidewalls of the vehicle bed in a longitudinal direction between the tailgate of the vehicle bed and the front wall thereof. The rails each include at least one elongate channel extending along the longitudinal length thereof. The universal rail system also includes at least one mounting means associated with each rail for adjustably affixing the rails to the sidewalls. The mounting means is adapted to cooperate with the rails to compensate for a degree that the sidewalls deviate from a substantially parallel alignment positions along the longitudinal direction (e.g., a degree of taper between the front wall of the vehicle bed and the tailgate of the vehicle bed) so that the rails have a substantially parallel relationship with respect to one another in the longitudinal direction.

Preferably, at least a portion of the mounting means is at least partially disposed in at least one opening formed in the respective sidewalls of the vehicle bed. The mounting means also preferably comprises adjustable fastening means including a bracket member. The bracket member preferably includes a first member extending from a first end toward a distal end thereof adjacent the inner surface of the sidewall, and a flange disposed at the distal end of the first member and extending away from the first member toward an interior portion of the vehicle bed within the vehicle bed. The mounting means also includes means for adjustably securing the rails to a respective flange of the bracket member in a position so that at least one channel of one of the rails is in parallel alignment with at least one channel of the other rail in the longitudinal direction. Preferably, at least one channel in each rail has an opening that faces inward toward the inner portion of the vehicle bed.

Preferably, the means for adjustably securing the rails to the respective flanges comprises at least one fastening member extending from the rails through an elongated opening formed in the flange of the bracket member, and a corresponding fastening member configured to securely mate with the fastening member to achieve a secure relationship between the rails and the flanges. The fastening member can be a threaded shank, such as a bolt, for example, and the corresponding fastening member can be an appropriately threaded nut.

According to another embodiment of the present invention, a universal rail system for a vehicle having a bed is provided, which is provided in an interior portion of the vehicle bed by a method including the steps of positioning at least one mounting member on a portion of each opposed sidewall of the vehicle bed proximate an inner surface of the sidewalls such that the mounting members extend from a respective opening formed in the sidewalls, and providing at least a first and second rail each having at least one elongate channel extending along a longitudinal length thereof. The method also includes the steps of disposing the rails on a flange of a respective mounting member adjacent the inner surface of the sidewall, partially securing the rails on the flanges of the mounting members, determining a parallel alignment position between the rails in the longitudinal direction, and respectively securing the rails to the flanges while the rails are in the parallel position.

According to one aspect of the present invention, the determining step preferably includes the steps of situating an accessory unit in at least one corresponding channel of each rail so that the accessory unit extends transversely across the vehicle bed between the rails, and sliding or translocating the accessory unit along the respective channels of the rails over a distance in the longitudinal direction (between the front wall of the vehicle bed and the tailgate thereof) to determine the parallel position between the rails.

The rails can be easily aligned during installation when the sidewalls of the vehicle bed are theoretically parallel or even when the sidewalls of the vehicle bed are not parallel but instead have a degree of taper along the longitudinal length thereof. That is, even when the vehicle bed sidewalls on which the rails are mounted are not parallel, a parallel rail alignment can be easily achieved, for example, by slidably mounting an accessory unit in the opposed rail channels of partially secured rails and sliding the accessory unit within the channels in the longitudinal direction (i.e., between the tailgate of the vehicle bed and the front wall thereof) until the accessory unit slides in an uninhibited manner along the length of the rails. The rails are then securely fastened in this position.

The rails are essentially and effectively self-adjusted during this process. That is, the securing or fastening means, which are attached to the rails either as a part extending from the rail or as a bolt or other shank member passing through and extending from the rail, are partially secured to a mounting member, but are allowed to move a distance in a lateral or transverse direction (i.e., substantially perpendicular to the longitudinal direction) on a portion of the mounting member. The lateral distance corresponds to the degree of lateral movement experienced by the rails in order to achieve substantially uninhibited longitudinal movement of the accessory unit within the rail channels of the rails that are disposed on non-parallel sidewalls. Once substantially uninhibited movement of the accessory unit in the longitudinal direction is achieved, the rails are tightly secured to the mounting members in that position to lock the rails in place in the slidably parallel configuration.

The self-adjusting nature of the universal rail system allows the universal rail system to be effectively installed on vehicles having any ordinary degree of taper along the longitudinal direction between the front wall of the vehicle bed and the tailgate thereof. In that manner, a single universal slide rail model can be appropriately fitted to and properly installed on many different types of vehicles made by different manufacturers who naturally provide different, individually recognized taper specifications.

Moreover, the self-adjusting nature of the universal rail system is not lost on vehicles that are initially manufactured to have substantially parallel sidewalls in the beds thereof. Little initial adjustment would be required in order for the rails to be installed in a substantially parallel position in this case. However, those skilled in the art readily understand that theoretical vehicle specifications and actual vehicle specifications can vary. This variation can exceed the tolerances, and such discrepancies can be particularly emphasized after a vehicle has been driven for a period of time, experiences any degree of misalignment, or has been in an accident that distorts the frame alignment. Where a vehicle once having a bed with substantially parallel sidewalls may not have originally required any special considerations to appropriately install the rails of a slide system on its sidewalls, over time, that same vehicle can come to experience a significant degradation in the parallel relationship between the slide walls, which results in a loss of functionality of the previously slidable accessory unit as the relationship between these sidewalls (and the rails fixed thereto) is skewed or altered.

In such cases, it would be desirable, and is now possible with the universal rail system according to the present invention, to easily re-adjust the position of the rails along the sidewalls to compensate for the skewed or altered sidewall relationship and to then re-secure the rails in a new position that again allows an accessory unit to move freely in the longitudinal direction along the rail channels. Instead of purchasing a new vehicle or completely replacing an otherwise undamaged rail system that no longer functions in the intended manner due to the skew, the universal rail system of the present invention can be easily adjusted on an individual vehicle to meet the present need.

In that manner, the universal rail system according to the present invention can be suitably and desirably provided as an aftermarket option on all vehicle beds having varied degrees of taper and parallel vehicle beds alike, no matter the manufacturer. Even more, the same universal rail system model can also be suitably and desirably provided to a variety of different manufacturers for pre-market installation during assembly, as well.

This self-adjusting feature afforded by the universal rail system according to the present invention is but one feature that sets the universal rail system apart from prior art slide rail systems. The ease with which the universal rail system according to the present invention can be adjusted to compensate for any degree of taper not only allows the universal rail system to be used on any number of different types of vehicles, but also removes the difficulties associated with the degree of precision measurements previously required to install custom built slide rail systems designed to individually compensate for specifically different degrees of taper and taper configurations that are known in the industry to be associated with a particular vehicle manufacturer's specifications. Removing the precision measuring steps reduces installation errors, reduces the incidence of damage to either or both the vehicle and the rail system during installation and also eliminates the need to perform timely testing and re-installing steps, which may require unbolting and rebolting the entire rail system. Removing these steps ultimately increases the ease and efficacy of the manpower used and significantly reduces the required installation time.

In addition, the universal rail system according to the present invention can be easily mounted in the traditionally provided stake pockets, or in other openings formed in the sidewalls of the vehicle bed. Even so, however, the universal rail system according to the present invention does not obscure these stake pockets or similarly placed openings on the upper surfaces of the vehicle sidewalls, and allows for other objects or accessories to be mounted therein as needed or desired. This accessibility to the stake pockets/openings has not been heretofore realized in connection with the top mounted sliding rail systems of the prior art.

Furthermore, because the universal rail system according to the present invention is substantially entirely positioned proximate an inner wall surface of the sidewalls of the vehicle bed, the top surface of the sidewalls is not obscured by either the rail or the mounting portions of the apparatus, as is the case with prior art slide rail systems. In that manner, a variety of additional top-mounted type accessory units can be used simultaneously with the universal rail system, and removal of one is not necessary for the use of the other. Indeed, the universal rail system according to the present invention increases the potential options and the number of accessory units that can be implemented at one time. For example, a vehicle bed can be suitably equipped with a cap, tonneau cover or ladder rack while at the same time being provided with an accessory unit such as a tool box that slidably relocates within the bed. The ability to provide a useful coexistence between top-mounted accessory units and slidable rail systems has been heretofore unrealized in the automobile industry.

BRIEF DESCRIPTION OF THE DRAWINGS

For a better understanding of these and other objects of the present invention, reference will be made to the following detailed description of the invention which is to be read in association with the following drawings wherein.

DETAILED DESCRIPTION OF THE INVENTION

Figure 1:
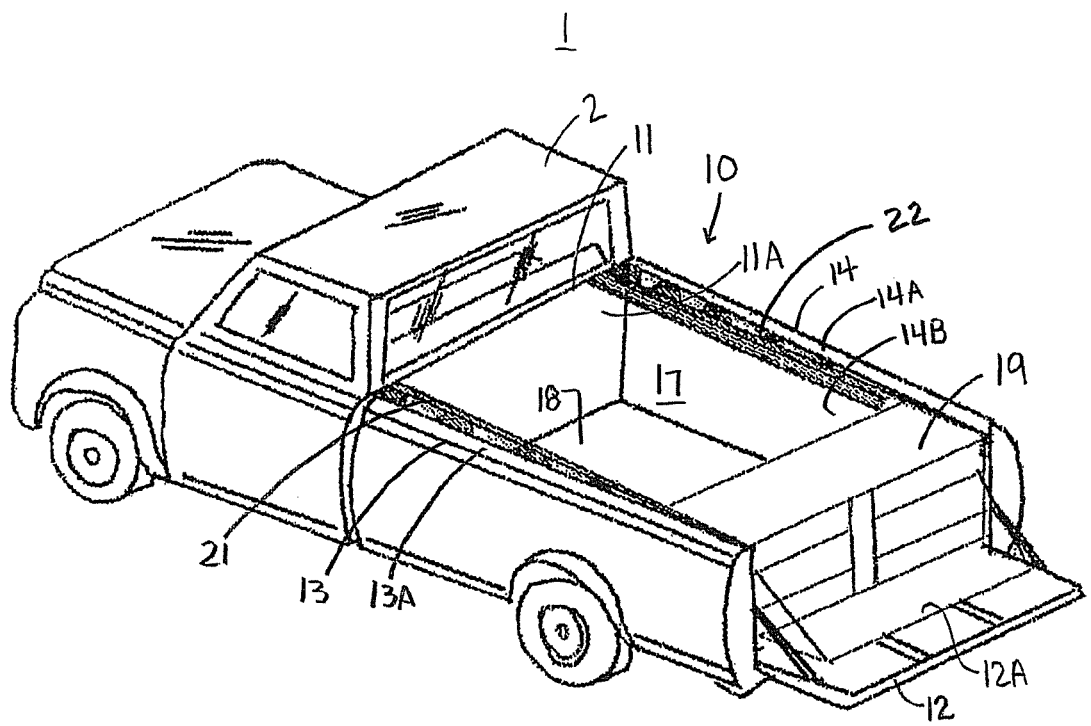
FIG. 1 is a perspective view of a vehicle equipped with a universal rail system according to one embodiment of the present invention and including a tool storage box accessory unit that is slidably mounted upon the rails within the bed of the vehicle.

FIG. 1 is a perspective view of a vehicle 1, for example a pickup truck, as shown, including a passenger cab 2 and a vehicle bed 10. The vehicle 1 shown in FIG. 1 is equipped with a universal rail system according to one embodiment of the present invention.

The vehicle bed 10 is defined by a front wall 11 positioned proximate the passenger cab 2, a tailgate 12 spaced a distance from the front wall 11 in the longitudinal direction of the vehicle bed 10 defining the overall length of the vehicle bed 10, and a horizontal bed surface 18. The vehicle bed 10 also includes a first sidewall 13 and an opposed second sidewall 14. The sidewalls 13, 14 are spaced a distance from one another in the transverse or lateral direction to define the overall width of the vehicle bed 10, which is likely to vary in different locations depending upon the taper of the sidewalls, or the degree to which the sidewalls deviate from being parallel to one another along the longitudinal length of the bed 10. The degree of taper that is intentionally provided to the sidewalls 13, 14 when the vehicle is initially assembled can be seen more clearly in FIG. 2, which is a top view of the vehicle bed 10 shown in FIG. 1 (without the toolbox 19).

Figure 2:
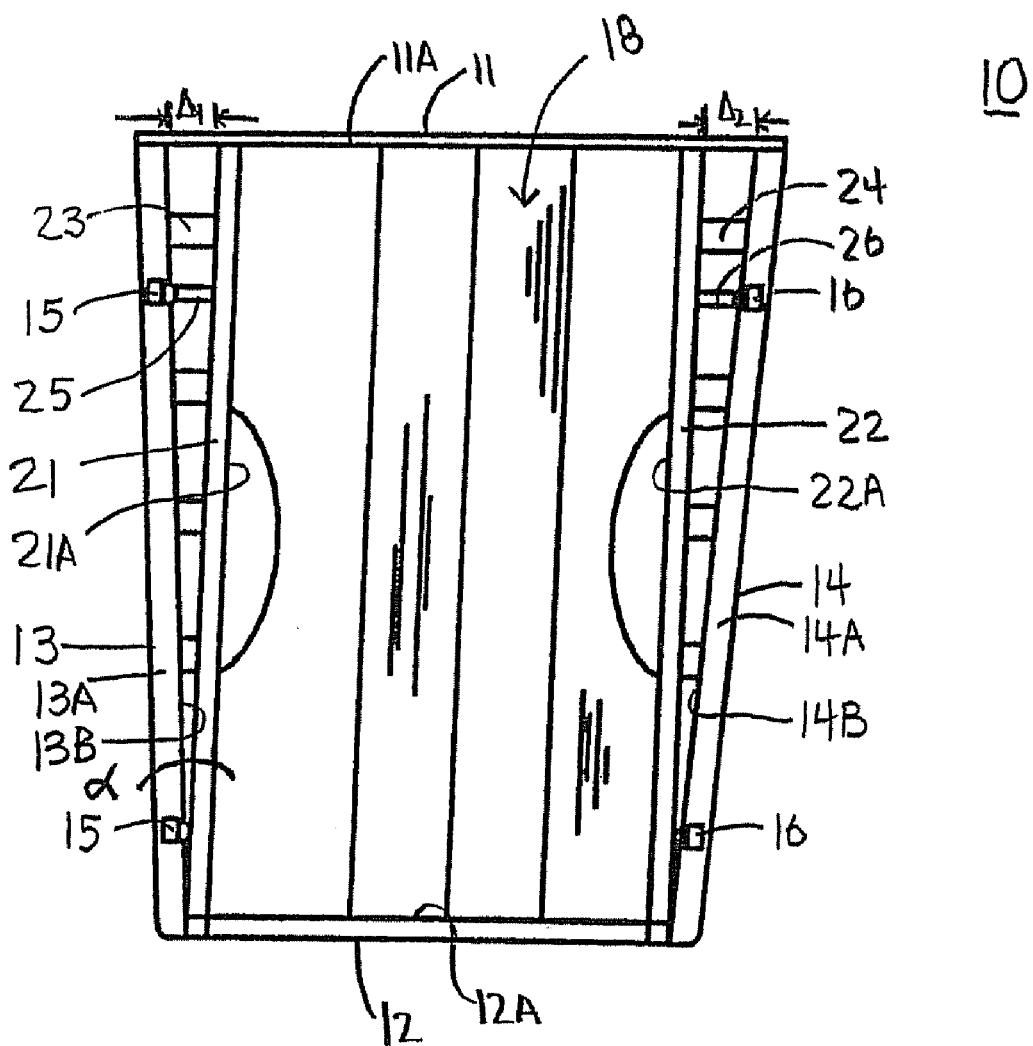
FIG. 2 is top view of the vehicle bed shown in FIG. 1 without the tool box shown in FIG. 1.

Each sidewall 13, 14 has a respective upper surface 13A, 14A and a respective inner surface 13B, 14B. The inner surface 13B of the first sidewall 13 faces the inner surface 14B of the second sidewall 14 across the transverse or lateral width of the vehicle bed 10. The interior portion 17 of the vehicle bed is effectively bounded by an inner surface 11A of the front wall 11, an inner surface 12A of the tailgate 12, and the opposed inner surfaces 13B, 14B of the respective sidewalls 13, 14. The interior portion of the vehicle bed 10 can be open, so that the bottom surface 18 of the bed is exposed as shown in FIGS. 1 and 2, or substantially closed off with a cap or cover, for example, mounted on the upper surfaces 13A, 14A of the respective opposed sidewalls 13, 14. In that manner, the universal rail system of the present invention is not limited to being mounted only on vehicles having an "open" bed.

FIGS. 1 and 2 also show a first rail 21 affixed to the first sidewall 13 via stake pockets 15 formed in the upper surface 13A of the sidewall 13 and a horizontal portion 25 of the corresponding mounting member bracket clip that extends (downwardly and inwardly in the lateral direction) from the stake pockets 15 proximate the inner surface 13B of the first sidewall 13. FIGS. 1 and 2 also show an opposed second rail 22 affixed to the second sidewall 14 via stake pockets 16 formed in the upper surface 14A of the sidewall 14 and a horizontal portion 26 of the corresponding mounting member bracket clip that extends (downwardly and inwardly in the lateral direction) from the stake pockets 16 proximate the inner surface 14B of the second sidewall 14. The portions 25, 26 of the bracket clips shown in FIG. 2 correspond to an upper surface of a horizontal flange portion of the bracket clip on which the rails 21, 22 are situated and ultimately secured to mount the rails on the respective sidewalls 13, 14. The configuration of the rails 21, 22 shown in FIGS. 1 and 2 will be described in more detail below in connection with the rail 40 shown in FIG. 4, for example.

As shown in FIG. 2, the sidewalls 13, 14 do not run parallel to one another along the longitudinal length of the bed 10 (i.e., the distance measured between the front wall 11 and the tailgate 12). The lateral distance between the opposed sidewalls 13, 14, as shown, decreases from the front wall 11 toward the tailgate 12. In that manner, it can be said that the sidewalls 13, 14 converge toward one another at a certain angle so that the sidewalls 13, 14 taper inwardly toward the tailgate 12. The opposing degree of taper that is required for the rails to compensate for the degree of taper of the sidewalls can be defined in terms of the angle α shown in FIG. 2, and is explained also in terms of the distances $\Delta_1$ and $\Delta_2$ shown in FIG. 2.

The distances $\Delta_1$ and $\Delta_2$ represent the difference in the lateral position between the respective inner surfaces 13A, 14A of the sidewalls 13, 14 and the respective surfaces 21A, 22A of the rails 21, 22 that face the inner surfaces 13A, 14A of the sidewalls 13, 14 once the rails 21, 22 are brought into a parallel relationship with respect to one another. This distance represents the inward lateral distance that the sidewalls 13, 14 would effectively need to be moved in order to at least bring the inner surfaces 13A, 14A of the sidewalls in parallel. A plurality of spacers 23, 24 can be provided between the sidewall inner surfaces 13A, 14A and the rails 21, 22 to accommodate the varying spaces therebetween, which decrease, as shown, from a maximum value proximate the front wall 11 toward the tailgate 12.

The angle α is measured from the other end of the bed 10, that is, from the end proximate the tailgate 12, and represents the angle at which the rails 21, 22 and the sidewalls 13, 14 diverge once the rails are set to achieve a parallel relationship. This is the degree of sidewall taper to which the position of the rails 21, 22 will adjust when they are finally installed as shown. One skilled in the art would understand the degree of precise measurement that would ordinarily be required to mathematically determine the accurate positions required to provide slidably parallel rails having a given a taper condition such as that described above.

FIG. 1 shows a tool storage box 19 provided as an accessory unit that is slidably mounted in correspondingly opposing channels (not shown in FIGS. 1 and 2) of the first and second rails 21, 22 positioned proximate the inner surfaces 13A, 14A of the sidewalls 13, 14. The toolbox 19 spans the lateral distance between the rails 21, 22 in a transverse manner within the interior portion 17 of bed 10 of the vehicle 1. The toolbox 19 can be slidably translocated from a position proximate the tailgate 12 to any other longitudinal position along and within the bed 10 to aid in the initial positioning of the rails 21, 22 to determine and compensate for any taper between the sidewalls to provide substantially parallel sliding surfaces once the rails are fully secured in the parallel position, as shown in FIGS. 1 and 2.

Figure 3:
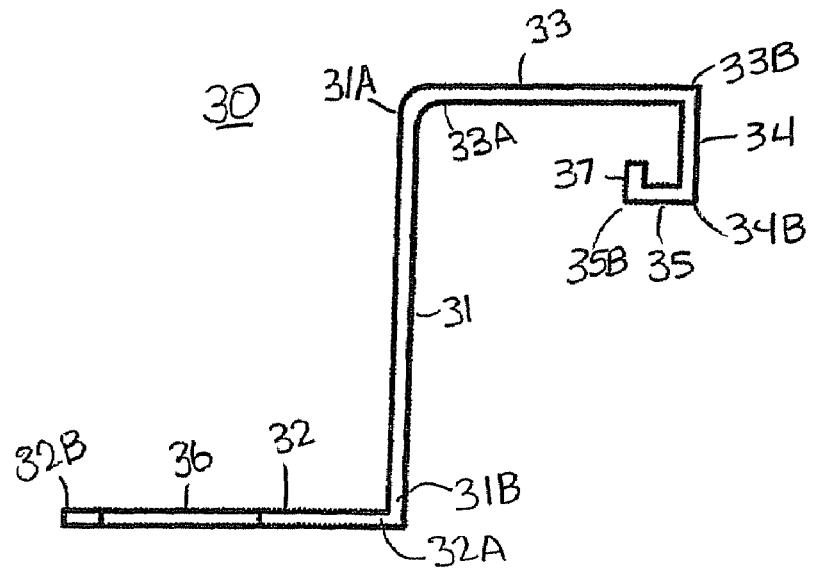
FIG. 3 is a sectional end view of one embodiment of a bracket clip according to the present invention.

FIG. 3 is a sectional end view of a mounting member bracket clip 30 on which rails, such as rails 21, 22 of FIGS. 1 and 2, for example, are situated and secured according to one embodiment of the present invention. Although portions of the bracket clip 30 are described in the context of being mounted in the specific orientation shown in FIGS. 3, 6 and 7, it should be noted that it is the overall structural relationship between these portions, not the specific "directional" descriptions, that is important.

As shown in FIG. 3, the bracket clip 30 includes a first "vertical" member 31 that extends from a first end 31A thereof toward an opposed distal end 31B thereof. The bracket clip 30 also includes a first, lower "horizontal" flange 32 extending from a first end 32A thereof, which is proximate the second end 31B of the first member 31, toward an opposed distal end 32B thereof. A second, upper "horizontal" flange 33 is also provided proximate the first end 31A of the first member 31, and extends from an elbow at a first end 33A thereof toward an elbow portion 33B in a horizontally oriented direction that is opposite to the horizontally oriented direction in which the first (lower) flange 32 extends. The elbow portion 33B bends in a substantially perpendicular manner to define a hook-like clipping appendage including second and third "vertical" members 34, 37 that terminate in respective elbow joints 34B, 35B as shown, and a "horizontal" member 35 positioned between the perpendicular (as shown) elbow joints 34B and 35B. The hook-like clipping structure shown here at the upper portion of the bracket clip 30 is adapted to engage an inner surface or lip of the stake pocket as shown, for example, in FIG. 6, when the bracket clip 30 is clipped to essentially hang in place along the inner surface of the sidewall of the vehicle bed.

The first, lower "horizontal" flange 32 includes an elongated or slotted opening 36 formed along at least a portion of the lateral (horizontal) length thereof which is sufficient to accommodate a securing or fastening means, such as a carriage bolt or other shank member extending from the rails, for example. The provision of such an opening makes it possible to adjust and secure the rails in a variety of different lateral positions on the flange 32 within the opening 36. This contributes to the self-adjusting nature of the universal rail system according to the present invention. As mentioned above, the lower flange 32 corresponds to the portion of the bracket clip 26 (and also 25 on the opposite side) that can be seen from above in FIG. 2. The opening 36, however, is not shown in FIG. 2.

Figure 4:
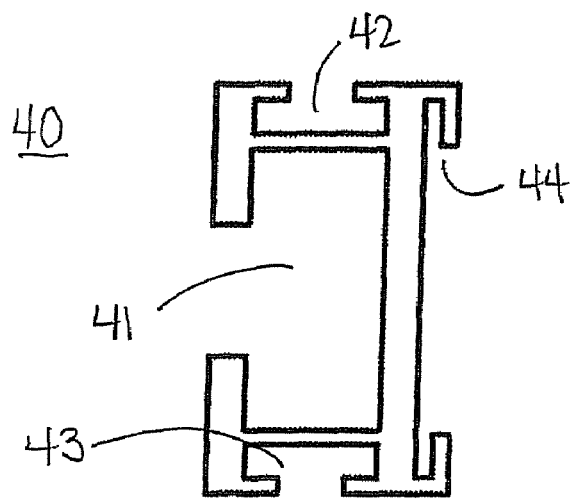
FIG. 4 is an end view of one of the opposed rails (e.g., the second rail 14 as shown in FIGS. 1 and 2)

FIG. 4 is an end view of a rail 40 (having an orientation that corresponds to the second rail 22 mounted on sidewall 14 in FIGS. 1 and 2, for example). Again, while certain structural features are described herein in terms of being vertically and horizontally oriented, it should be noted that if the orientation of the rail 40 or bracket clip 30 should change, the descriptive directional language would also change in a corresponding manner.

The rail 40 includes a number of elongate channels formed therein, each of which can be used to serve a variety of different functions, as would be understood by those skilled in the art upon reading this description. These channels can be formed to run or extend along a portion of or along the entire longitudinal length of the rails. For example, the rail 40 shown in FIG. 4 (and also shown in FIG. 7) includes a main or central channel 41 that is situated to open into the interior portion 17 of the vehicle bed and which preferably extends along the entire longitudinal length of the rail 40. In this manner, an accessory unit that is mounted to glide along the surfaces of the channel 41 can be slidably translocated from one end of the rail to the other in the longitudinal direction over the entire length of the rail 40. The channel 41 shown in FIG. 4 is defined by three interior surfaces, for example, and the interior area of the channel is sized to be sufficient to accommodate and appropriately retain a number of glide wheels or other similar sliding structures that may be provided on an accessory unit in a variety of orientations, so that the glide structures of the accessory unit can appropriately contact and glide along any one or all of the interior surfaces of the channel 41.

The rail 40 also includes a first T-channel 42 (i.e., an upper T-channel as shown) and an opposed second T-channel 43 (i.e., a lower T-channel as shown). The first or upper T-channel 42 can be used to accommodate an additional accessory unit mounted for slidable movement along the top surface of the rail 40, for example. The second or lower T-channel 43 is generally used in connection with securing or adjustably fastening the rail on mounting members such as bracket clips or brackets that are positioned along the sidewalls of the vehicle bed as the rails on the opposed sidewalls are adjusted to be parallel and are ultimately fixed. This is shown and described in more detail below in connection with FIG. 7.

The rail 40 can also include an additional T-channel 44 provided on a surface of the rail 40 that is oriented, as shown, opposite the channel 41 and which opens to face the inner surface 14B of the sidewall 14 of the vehicle bed. In the example shown in FIG. 4, this T-channel 44 can be formed as a horizontally or laterally narrow T-channel compared with the dimensions provided to the central channel 41, and can also have a greater length or height dimension in the vertical direction. Providing the channel 44 is not essential to the structure and function of the universal rail system according to the present invention and it should also be understood that C-channels, for example, could be provided in place of some of the T-channels shown in the drawings.

Figure 7:
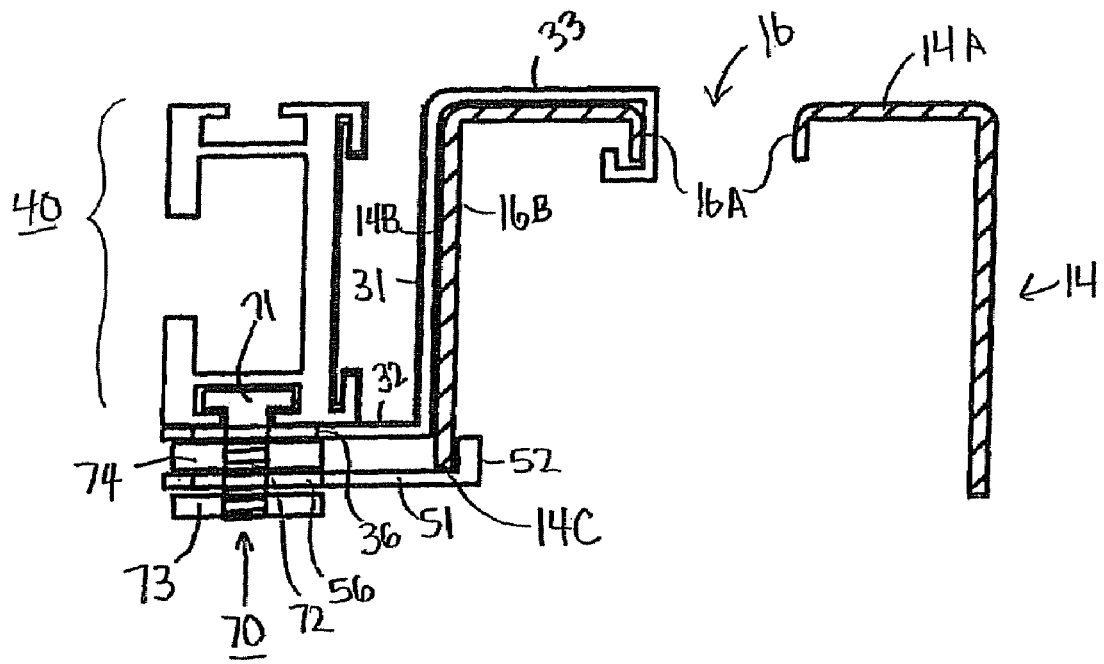
FIG. 7 is a sectional end view showing the bracket clip of FIG. 3 attached to the sidewall of the vehicle bed via a portion of a stake pocket, the rail of FIG. 4 situated on and fastened to the bracket clip, and the auxiliary bracket of FIG. 5 fitted beneath the skirt of the inner surface of the vehicle sidewall and secured to the rail and the bracket clip via a bolt, washer and nut assembly.

Providing channel 44 can be useful, however, to mount one or more spacers 23 (on the sidewall 13) and 24 (on the sidewall 14) as shown in FIG. 7. These spacers are provided to accommodate the changing gap between the inner surface of the sidewalls of the vehicle bed and the directly opposing surfaces of the rails. While the rail 40 can be securely affixed to the bracket clip 30 and held in place without the use of spacers, such spacers can be used to further enhance the strength and structural stability of the rail, particularly when the rail is positioned a distance away from the sidewall. In that manner, heavy-duty type slidable accessory units can be properly used without damaging the rails or experiencing sliding impedance due to rail deformation or detachment and the like.

Figure 8:
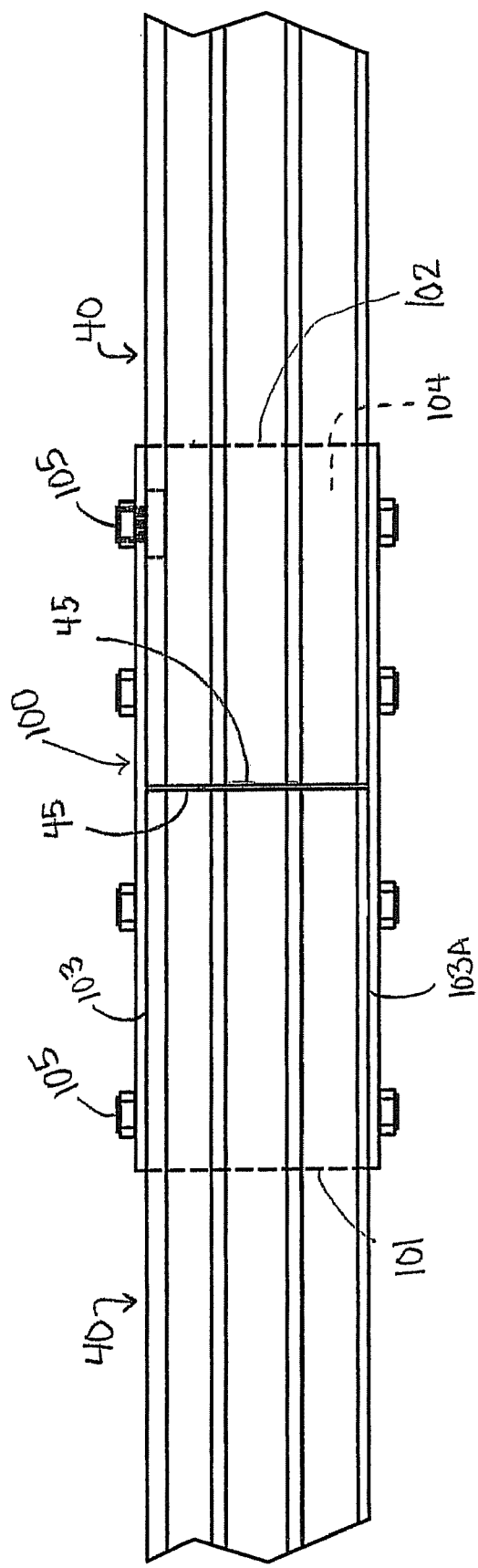
FIG. 8 is a longitudinal side view of a splice bracket joining two rail sections.
Figure 9:
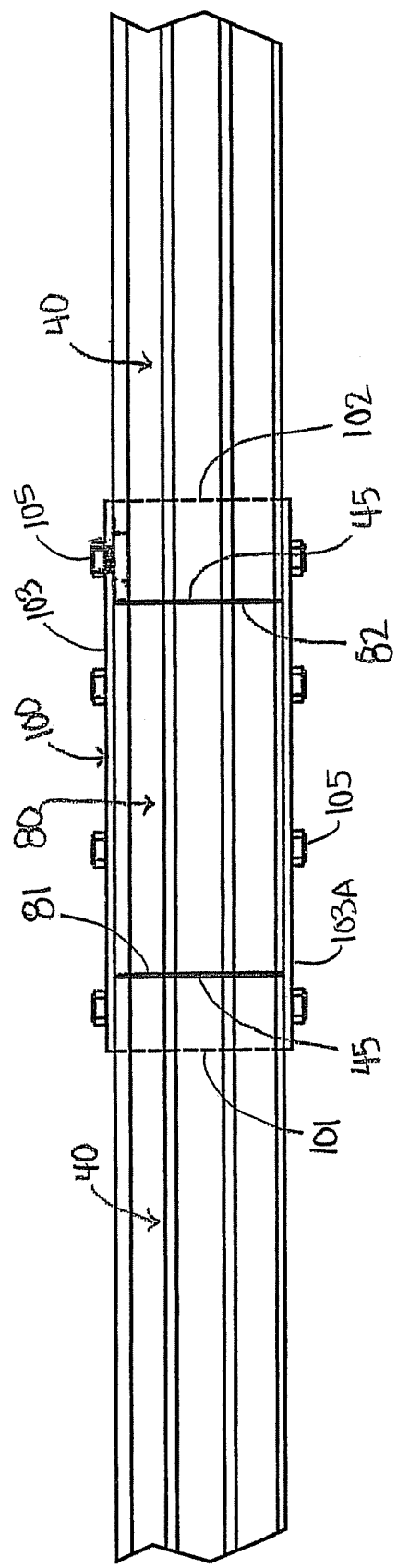
FIG. 9 is a longitudinal side view of a splice bracket and an extension member joining two rail sections.

As shown in FIGS. 8 and 9, the rails 40 can be made as modular units that are joined to one another with a connecting member such as splice brackets 100, so that shorter rail sections can be assembled to have an overall length that appropriately corresponds to the longitudinal length of the vehicle bed. Since most vehicles are manufactured to have different bed lengths, the rails can be provided in a variety of standard length increments that can be mixed and matched as needed to provide the desired length needed for any particular vehicle. Rail units having a standard length can be used in conjunction with extension members, such as the extension member 80 shown in FIG. 9, to help provide the desired overall length, if necessary. For example, if a vehicle bed is considered to be 6 feet long, two three-foot rail sections could be abutted and spliced together as shown in FIG. 8 to accommodate the total overall length. If the vehicle bed were instead seven feet long, the same two three-foot rail sections could still be used, and spliced together along with a one-foot extension member 80 as shown in FIG. 9. While FIG. 9 shows the extension member interposed between two rail sections, it should also be understood that extension members could be alternatively or additionally connected to either rail section at the other ends (not shown) thereof in much the same manner as described herein in connection with FIGS. 8 and 9.

The method by which the rail sections can be joined is not limited, and the joining can be affected by any known technique that would suitably secure the rail sections without impeding the sliding performance of the tracks, particularly the main or central tracks. In the examples shown in FIGS. 8 and 9, the ends 45 of the rail sections 40 are brought into an abutted position and secured using the splice bracket 100 that longitudinally spans the vertical joining surface of the two rail sections.

The first end 101 of the splice bracket 100 extends beyond the end 45 of one rail section, and the longitudinally opposed second end 102 of the splice bracket 100 extends beyond the abutted end of the other rail section. The end portions of the rail sections to be joined are situated between an upper portion 103 and a lower portion 103A of the splice bracket 100 so that the corresponding channels of the rail sections are substantially longitudinally coaxially aligned. The splice bracket 100 also includes an integral back portion 104 (not shown) vertically connecting the upper portion 103 and the lower portion 103A that extend perpendicularly therefrom. The splice bracket 100 is secured to the rail sections with fastening members 105 that are positioned on either side of the vertical joining interface between the two abutted ends 45 of the rail sections.

As shown, some of the fastening members 105 pass through the upper portion 103 of the splice bracket 100 and a portion of the rail sections and are secured in a portion of the upper T-channel of the rail sections, and other fastening members 105 are similarly positioned to pass through the lower portion 103A of the splice bracket 100 and a corresponding portion of the rail sections, and are secured in the lower T-channels of the respective rail sections. While the positions of these fastening members 105 within the upper and lower T-channels, as shown, could potentially interfere with or impede the free-sliding ability of an accessory unit mounted therein, it will be understood by those skilled in the art that certain methods and fastening members (such as countersinking, for example) could be used so as not to substantially impede gliding within these channels or tracks. In any case, the splice bracket 100 securely fastens the abutted ends of the rail sections so that the channels of both rail sections are coaxially aligned to provide unimpeded longitudinal translocation for glidable accessories mounted in at least the central channel of the rails.

Similar to the modular embodiment shown in FIG. 8, the rail extension member 80 shown in FIG. 9 is interposed between the ends 45 of the rail sections so that one end 81 is abutted with the end 45 of one rail section while the opposed end 82 is abutted with the end 45 of the other rail section. The rail extension member 80 has a structure that directly corresponds to that of the rail sections joined thereby, and a similar splice bracket 100 can be used to achieve secure joining and coaxial alignment in a similar manner as described above.

It should be understood that the particular "standard" lengths of the universal rail sections can be determined based on present industry need and the design considerations of the time, and is not limited to the three-foot section example described above. Likewise, any number of "standard" extension members 80 can be made to have different lengths to compensate for a variety of different vehicle bed lengths that differ from the "standard" rail section lengths.

Providing the rail sections in a modular unit manner improves the manufacturing considerations otherwise required to produce long rails, and allows the rails to be individually packaged, or packaged in groups, in smaller configurations (at least length-wise) for shipping, storage and marketing purposes. This also provides a desirable improvement over the difficult conditions otherwise associated with packaging, shipping, storing and marketing longer rails or rail sections.

Figure 5:
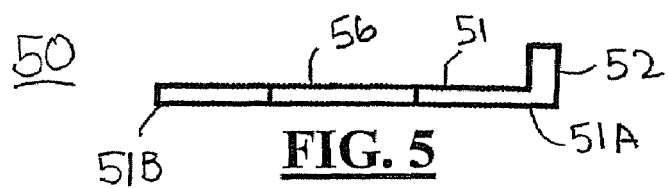
FIG. 5 is an end view of an auxiliary bracket.
Figure 6:
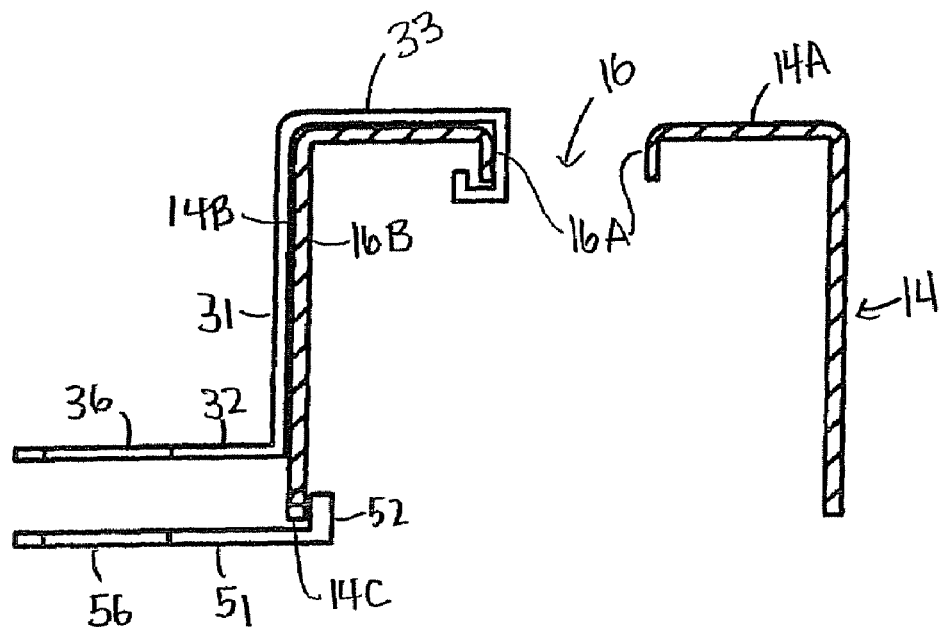
FIG. 6 is a sectional end view showing the bracket clip of FIG. 3 attached to the sidewall of the vehicle bed via a portion of a stake pocket and the auxiliary bracket of FIG. 5 fitted beneath the skirt of the inner surface of the vehicle bed sidewall.
Figure 10A:
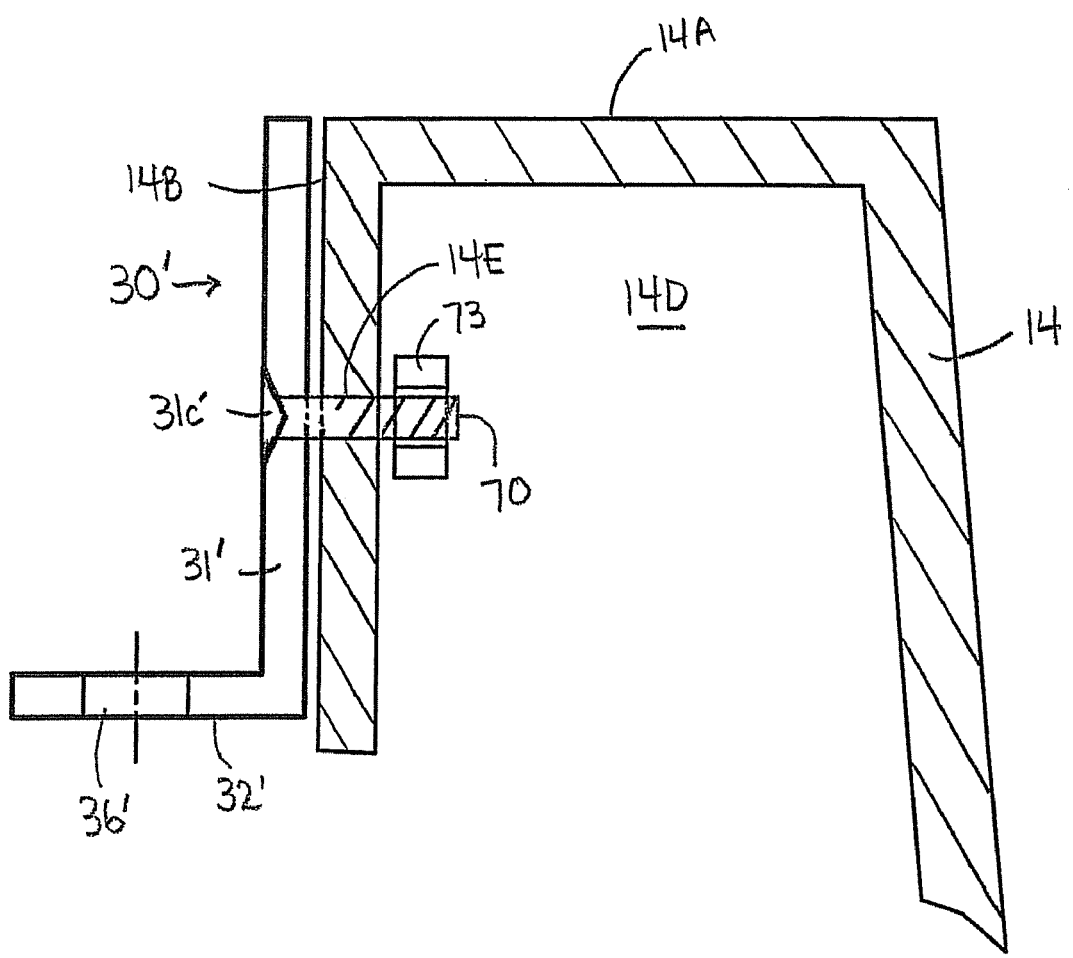
FIGS. 10A and 10B are sectional end views of a mounting bracket according to another embodiment of the present invention positioned in different locations on the sidewall of the vehicle bed.

FIG. 5 is an end view of an auxiliary bracket 50 that can be used in conjunction with the bracket clip 30 shown in FIG. 3 or the bracket 30' shown in FIG. 10A, for example, to finally secure the rails in place once a sufficiently parallel rail alignment position has been achieved. The auxiliary bracket 50 includes a main member 51 that extends from a first end 51A to an opposed second end 51B thereof. As shown in FIGS. 5-7, the auxiliary bracket 50 is oriented so that the main member 51 is substantially horizontally disposed and is substantially parallel with the flange 32 of the bracket clip 30. A lip 52 extends from the first end 51A of the main member 51 in a direction that is substantially perpendicular to the direction in which the main member 51 extends (e.g., vertically disposed as shown in FIGS. 5-7).

The lip 52 of the auxiliary bracket 50 can be positioned under the skirt of the inner surface of the sidewall of the vehicle bed. For example, as shown in FIGS. 6 and 7, the lip 52 of the auxiliary bracket 50 engages an inner surface 16B of the stake pocket 16 when positioned under the skirt 14C of the inner surface 14A of the sidewall 14. This auxiliary bracket 50 can be easily engaged or clipped in place in this manner and can be positioned in any desired location along the longitudinal length of the sidewall 14 in order to provide additional securing support to a corresponding mounting member to fix the rail in place, as shown in FIG. 7. It should be noted that any suitable fastening member can be used, and the present invention is in no way limited to the specific examples shown and described in connection with the drawings herein.

The auxiliary bracket 50 shown in FIGS. 5-7 also includes an elongated or slotted opening 56 in the main member 51 that generally corresponds to the elongated opening 36 in the bracket clip 30 so that an appropriate fastening means can pass through the two generally vertically aligned openings 36, 56 and engage the appropriate surfaces of both bracket clip 30 and the auxiliary bracket 50 to secure the fastening means in conjunction with a mating securing member (see, for example, the bolt assembly shown in FIG. 7).

FIG. 6 is a is a sectional end view showing the bracket clip 30 of FIG. 3 attached to the sidewall 14 of the vehicle bed via a portion of the stake pocket 16 and the auxiliary bracket 50 of FIG. 5 fitted beneath the skirt 14C of the inner surface 14A of the vehicle sidewall 14. The engagement of the auxiliary bracket 50 shown in FIG. 6 is described above.

The bracket clip 30 is positioned so that the hook-like structure (defined, for example, by the members 33, 34, 35 and 37, as well as the elbow joints 33B, 34B and 35B shown in FIG. 3) engages the lip 16A at the opening of the stake pocket 16 when the bracket clip 30 is installed or clipped into place. In this manner, as shown, the bracket clip 30 assumes a hanging-type arrangement once the hook-like end of the bracket clip 30 is clipped to engage the lip 16A of the stake pocket 16. The second flange 33 of the bracket clip 30 is disposed to extend (horizontally as shown) toward the interior portion of the bed from a portion of the opening of the stake pocket 16 along a portion of the upper surface 14A of the sidewall 14 (e.g., between the side of the stake pocket opening that is closest to the interior portion 17 of the vehicle bed and the edge of the upper surface 14A proximate the inner surface 14B). The first member 31 of the bracket clip 30 is disposed to extend (vertically downwardly, as shown) from the second flange 33 in a direction that is substantially parallel to the inner surface 14B of the sidewall 14. The member 31 can be positioned in an adjacent or slightly spaced apart manner from the inner surface 14B if needed, or in an abutted contact relationship, as shown in FIG. 6. This spacing can be changed by modifying the lateral, horizontal length of the second flange 33, for example.

In the arrangement described above, the flange 32 is positioned to extend inwardly toward the interior portion 17 of the vehicle bed (e.g., horizontally as shown from the member 31). The opening 36 of the flange 32 is generally vertically aligned with the opening 56 in the main member 51 of the auxiliary bracket 50, which is spaced a vertical distance from the bracket clip 30 (e.g., below the bracket clip 30 as shown) and is substantially parallel therewith.

FIG. 7 is a sectional end view showing the bracket clip 30 of FIG. 3 in a clipped engagement with the stake pocket 16 so that the bracket clip 30 is attached to the sidewall 14 of the vehicle bed. The rail 40 of FIG. 4 is shown to be situated on and secured to the flange 32 of the bracket clip 30, and the auxiliary bracket 50 of FIG. 5 is fitted beneath the skirt of the inner surface of the vehicle sidewall 14 and secured to the bracket clip 30 and the rail 40 via fastening means shown here as a bolt, washer and nut assembly.

That is, the fastening means can comprise a bolt 70 that includes a head portion 71 which is sized to be accommodated within the lower T-channel 43 of the rail 40. As shown in FIG. 7, the diameter or outer cross-sectional dimension of the bolt head 71 is greater than the lateral opening of the narrow part of the T-channel 43 that faces the bottom surface 18 of the vehicle bed (e.g., faces vertically downwardly). Bolts 70 having these types of heads can be inserted into the T-channel 43 from openings on the ends of the rails and slidably positioned into the proper location along the length of the rail. Those skilled in the art would understand how to insert and manipulate these fastening members or bolts, as shown, based on the disclosure provided herein.

The rail 40 is then positioned so that the shank portion 72 of the bolt 70, which extends (vertically downwardly as shown) from the bolt head 71 beyond the lower surface of the rail 40, is aligned with a portion of the slotted or elongated opening 36 in the flange 32 of the bracket clip 30. The lateral length of the elongated opening 36 allows the bolt shank 72 to assume a variety of different lateral positions along the horizontal length flange 32 within the length of the elongate opening 36 to enable the rails 40 to be adjusted as needed to achieve the desired sufficiently parallel relationship. The bolt 70 can be secured to the bracket clip 30 via a mating securing member, such as a nut that is tightened to contact the lower surface of the flange 32, once a sufficiently parallel alignment of the rails is achieved, or otherwise secured in the manner shown in FIG. 7.

That is, when an auxiliary bracket 50 is also used, a washer 74 or other type of securing spacer member can be interposed between the lower surface of the flange 32 of the bracket clip 30 and the upper surface of the member 51 of the auxiliary bracket 50. The bolt shank 71 is aligned to pass through an opening in the washer and on through the elongated opening 56 in the auxiliary bracket 50. As mentioned above, like the elongated opening 36 in the flange 32 of the bracket clip 30, the elongated opening 56 of the auxiliary bracket 50 is also elongated in the lateral direction (along the length of the member 51; e.g., horizontally elongated as shown). In that manner, the rail 40 can experience the necessary degree of lateral movement the during adjustment step before the nut 73 or other mating securing or fastening means is finally tightened onto the bolt shank 72 in its appropriate lateral position (with respect to the member 51 of the auxiliary bracket 50) once the rails 40 have been brought into a suitably parallel alignment position with one another.

As explained above, a sufficiently parallel alignment position between the rails that are otherwise not parallel can be achieved by mounting a transversely extending accessory unit (such as the tool box 19 shown in FIG. 1) in opposed main channels 41 of the respective rails. As the mounted accessory unit is slidably translocated in the longitudinal direction along the rails, the bolts or fasteners holding the rails onto the bracket clips (e.g., shank parts 72) move laterally within the elongated openings as the positions of rails is moved until the desired amount of slidability is achieved (which represents a substantially parallel rail alignment). The bolts or other fastening means are then secured using nuts or other corresponding fastening members while the rails are in that location so that the finally mounted rails remain substantially parallel, even when the sidewalls of the vehicle bed on which the rails are mounted are not parallel.

There are situations in which it would be desirable to provide a slide rail system in a position that is spaced a distance below the upper surface 14A and below the upper portion of the inner surface 14B of the sidewall 14. For example, certain after-market accessories that are known to be top-mounted types can also include a portion which extends over the inner edge of the sidewall 14 and into the bed of the vehicle proximate the inner surface 14B of the sidewall 14 at the upper portion thereof. In order to allow for the subsequent installation of such accessories, or in order to install a universal rail system according to the present invention in a vehicle bed that has been previously provided with such an accessory, it is necessary to position the rail a distance away from the upper surface of the sidewall to provide adequate clearances for both.

In connection with the foregoing, it should be noted that, while it is not shown in the drawings, it is understood that the embodiments of the bracket clips 30 shown in FIGS. 3, 6 and 7 can also be adapted to be positioned closer (laterally) to the inner surface 14B of the sidewall 14, if necessary, or spaced further away (e.g., vertically) from the upper surface 14A of the sidewall 14 by increasing or extending the vertical length of the member 31. In that manner, the flange 32 would be located farther away from the upper portion of the sidewall 14 so that a rail situated thereon would likewise be lower and farther away (vertically speaking) from the upper portion of the sidewall than the other embodiment shown.

It should also be noted, that while it is not shown in the drawings, one skilled in the art would also readily understand that the rail 40 shown in FIGS. 4, 6 and 7 and the rail 140 shown in FIG. 11 could also be directly fastened to the inner surface of the sidewall 14 in the same or a similar manner as bracket 30' shown and described below in connection with FIGS. 10A and 10B. Moreover, it would be understood that both the rail 40 shown in FIG. 4 and the rail 140 shown in FIG. 11 can likewise be suitably secured to either the bracket clip 30 or the bracket 30' in substantially the same manner described above in connection with FIG. 7. For rail systems having brackets according to the embodiments shown in FIGS. 10A, 10B and 11, however, the adjustment step involving using a slidable transverse-mounted accessory unit to bring the rails into a parallel alignment position would not necessarily be needed. That is, the rail systems of the embodiments shown in FIGS. 10A, 10B and 11 are preferably used in connection with the aforementioned vehicle beds that are already provided with substantially parallel sidewalls.

Figure 10B:
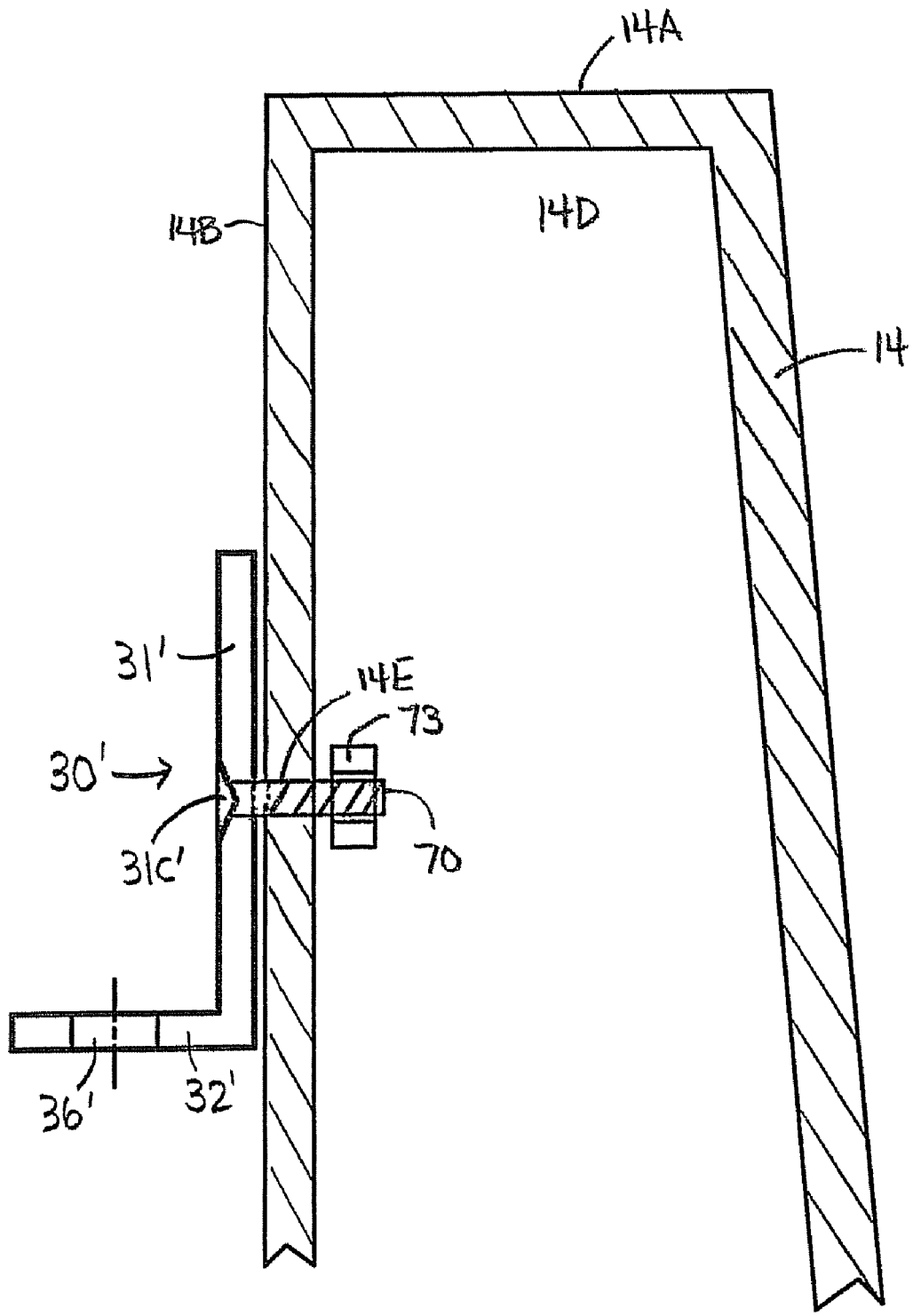

FIGS. 10A and 10B are sectional end views of a rail mounting bracket according to another embodiment of the present invention which is mounted or arranged to be affixed to the sidewalls through holes provided on the inner surface of the sidewall of the vehicle bed. In FIG. 10A, bracket 30' is positioned on and fixed directly to a portion of the inner surface 14B of the sidewall 14 proximate the upper surface 14A thereof. In FIG. 10B, the same bracket 30' shown in FIG. 10A is similarly mounted but is spaced a distance away (e.g., lower or vertically downward) from the upper surface 14A of the sidewall 14.

The bracket 30' shown in FIGS. 10A and 10B is fastened to the sidewall 14 via an opening 14E that opens on the inner surface 14B of the sidewall 14 that passes through to a hollow interior portion 14D of the sidewall 14. A fastening member, such as the bolt 70 shown in FIGS. 10A and 10B, is positioned to extend from a portion of the first ember 31' of the clip 30' through an opening formed therein, for example, which can suitably be formed as the counter-sunk opening 31c' shown in FIGS. 10A and 10B. The fastening member 70 passes into the interior portion 14D of the sidewall 14 where it is secured in place with a corresponding mating member, such as the nut 73 shown in the figures. As before, any suitable fastening means or members can be used, and the present invention is in no way limited to the specific examples shown and described in connection with the drawings herein. Since it is common to provide a significant distance between the floor or bottom surface 18 of the vehicle bed and the edge of the skirt 14C of the inner surface 14B of the sidewall 14 (see FIGS. 6 and 7), it would be appreciate by those skilled in the art that it would not be difficult to gain access to the interior portion 14D of the sidewall 14 to secure the bracket 30' to the sidewall.

Figure 11:
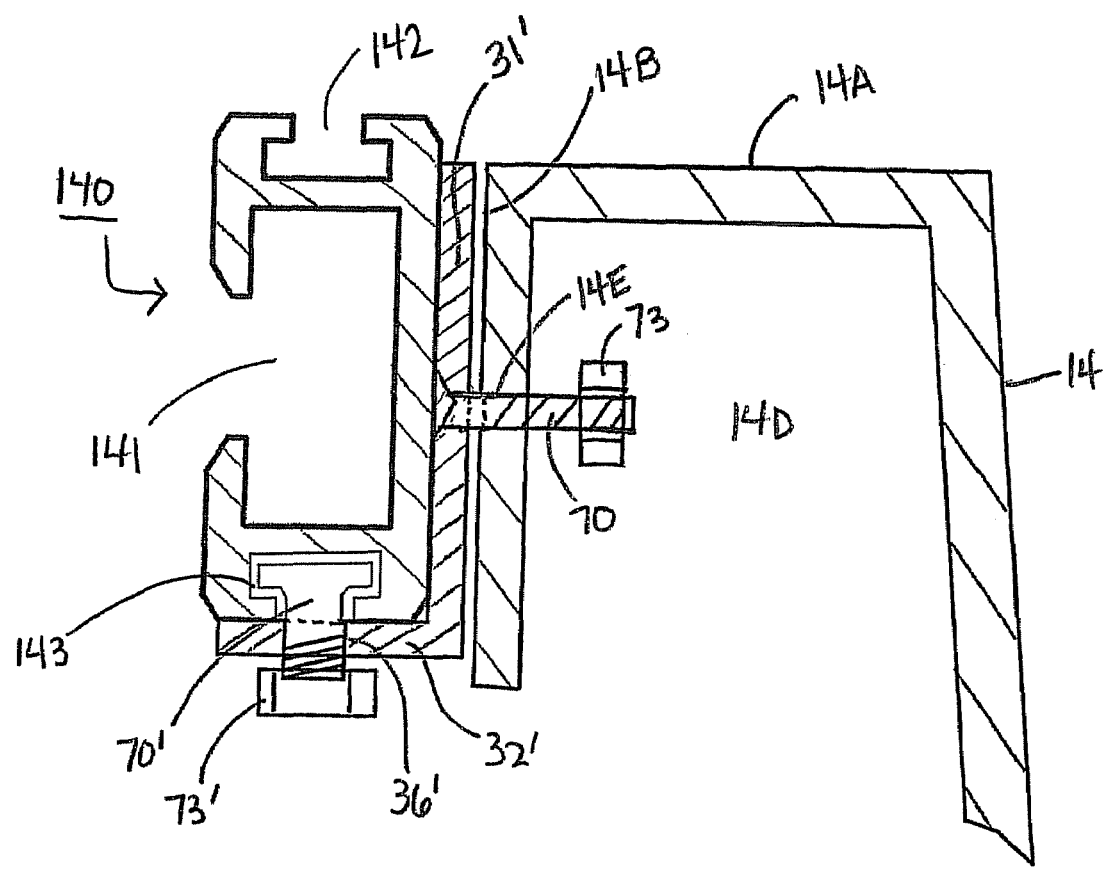
FIG. 11 is a sectional end view of the mounting bracket shown in FIG. 10A and a rail according to another embodiment of the present invention which is situated on and fastened thereto.

As explained above, a rail such as the rail 40 of FIG. 4 or the rail 140 shown in FIG. 11 can be situated on the flange 32' of the bracket 30' (also shown in FIG. 11) and secured in place in the same manner described above in connection with FIG. 7. That is, the rail 140 can be securely affixed in an appropriate location by adequately positioning a fastening member, such as the bolt 70 (FIG. 7) or 70', through the opening 36' in the flange 32' and securing the fastening member with a corresponding fastener, such as the nut 73 (FIG. 7) or 73' (FIG. 11).

In cases where the rail system of the latter embodiment is provided on vehicles whose beds have sidewalls that may not be arranged in a parallel alignment position, the position of the rails can be adjusted in the same manner described above if the flange 32' is provided with an elongated opening 36' (which is not shown in FIGS. 10A, 10B and 11) like opening 36 in the flange 32 of the bracket clip 30.

FIG. 11 also shows that the structure of the rail 140 differs from that of the rail 40 shown in FIGS. 4 and 7. In particular, the rail 140 does not include an additional, opposed T-channel 44 disposed to face the inner surface of the sidewall 14 upon installation. The corresponding surface of the rail 140 is instead shown as being substantially flat, while it is not limited to being so formed. Moreover, and more aesthetically speaking, the corners of the rail 140 are provided with a radius rather than a right angle like the rail 40. In all other ways, however, the rails 140 and 40 are substantially and functionally equivalent. That is, the rail 140 includes the same central or main channel 141 that is disposed to face the interior portion 17 of the vehicle bed upon installation, as well as a first (upper) T-channel 142 and an opposed, second (lower) T-channel 143.

It can be appreciated from the foregoing that central main channel 141 of the rail 140 serves the same purposes as the corresponding channel 41 of the rail 40, and that likewise, the upper and lower T-channels 142 and 143 would be suited to provide the same functions and benefits as the T-channels 42 and 43. As shown in FIG. 11, the rail 140 is secured to the flange 32' of the bracket 30' via the bolt 70' which is positioned within the interior portion of the "T" defining the lower channel 143 in the same manner described above in connection with FIG. 7, and extends through the opening 36' of the flange 32' to mate with the corresponding nut 73'. Repeat descriptions that would be understood and which do not differ from those described in detail above are therefore omitted.

As explained above, the way and ease with which the rails can be adjusted to achieve a parallel alignment, even when the rails are mounted on vehicle sidewalls that are not parallel, imparts a universal quality to the rail system of the present invention. That is, since the rails are adjusted to achieve a parallel relationship during installation in the above-described manner, parallel rails can be securely provided on the inner surface of sidewalls of vehicle beds having any degree of taper (within the limits imposed only by the lateral movement afforded within the slotted holes of the bracket clip). Thus, the universal rail system according to the present invention can be used in connection with vehicles from different manufacturers without requiring custom specifications for each vehicle brand.

In addition, because the universal rail system according to the present invention does not obscure the stake pockets and is mounted inside of the vehicle bed, e.g., proximate the inner surfaces of the vehicle bed sidewalls, additional top mounted accessories can be used without having to remove the universal rail system. Moreover, because the rails have a plurality of glide channels formed therein, a number of different accessories and support features can be provided on a single rail at the same time without interfering with one another.

In view of the foregoing, it is clear that the universal rail system of the present invention provides several important, new structural and functional improvements over known slide rails systems. A universal slide rails system having the features and functionality described herein in connection with the present invention has been heretofore unknown, until the Inventor's present disclosure herein.

While the present invention has been particularly shown and described with reference to the preferred embodiment in the drawings, it will be understood by those skilled in the art that various changes in its details may be effected therein without departing from the spirit and teachings of the invention.

What is claimed is:

1. A universal rail system for a vehicle having a bed defined at least in part by a front wall proximate a passenger cab of the vehicle, a tailgate distal from the front wall and a pair of opposed sidewalls extending in a longitudinal direction between the front wall of the vehicle bed and the tailgate thereof, said universal rail system comprising:

at least first and second rails adjustably affixed to a respective one of the sidewalls of the vehicle bed and extending proximate an inner surface of the sidewalls in the longitudinal direction between the front wall of the vehicle bed and the tailgate thereof, said rails each including at least one elongate channel extending along a longitudinal direction thereof; and mounting means associated with each said rail for adjustably affixing said rails to the sidewalls of the vehicle bed, said mounting means being adapted to cooperate with said rails to adjustably compensate for a predetermined intentional degree of taper by which the sidewalls deviate from a substantially parallel alignment position along the longitudinal direction between the front wall of the vehicle bed and the tailgate thereof so that said rails have a substantially parallel relationship with respect to one another in the longitudinal direction within the vehicle bed;

wherein at least a portion of said mounting means is situated in at least a portion of at least one opening formed in an uppermost surface of the respective sidewalls of the vehicle bed so that said mounting means covers a portion of the upper surfaces of the respective sidewalls that is located between the opening and the inner surfaces of the sidewalls, but does not extend outwardly beyond the opening toward an outer surface of the respective sidewalls or obscure the opening.

2. A universal rail system for a vehicle having a bed defined at least in part by a front wall proximate a passenger cab of the vehicle, a tailgate distal from the front wall and a pair of opposed sidewalls extending in a longitudinal direction between the front wall of the vehicle bed and the tailgate thereof, said universal rail system comprising:

at least first and second rails adjustably affixed to a respective one of the sidewalls of the vehicle bed and extending proximate an inner surface of the sidewalls in the longitudinal direction between the front wall of the vehicle bed and the tailgate thereof, said rails each including at least one elongate channel extending along a longitudinal direction thereof; and mounting means associated with each said rail for adjustably affixing said rails to the sidewalls of the vehicle bed, said mounting means being adapted to cooperate with said rails to adjustably compensate for a predetermined intentional degree of taper by which the sidewalls deviate from a substantially parallel alignment position along the longitudinal direction between the front wall of the vehicle bed and the tailgate thereof so that said rails have a substantially parallel relationship with respect to one another in the longitudinal direction within the vehicle bed;

wherein each said mounting means comprises adjustable fastening means, said adjustable fastening means including a bracket member comprising a first member extending from a first end thereof toward a distal end thereof adjacent the inner surface of the sidewalls, a first flange disposed at said distal end of said first member and extending away from said first member toward an interior portion of the vehicle bed, a second flange disposed at said first end of said first member and extending outwardly from a first end thereof proximate said first end of said first member away from the interior portion of the vehicle bed and over a portion of uppermost surfaces of the respective sidewalls, means for securably engaging at least a portion of at least one opening provided in the uppermost surfaces of the respective sidewalls, without obscuring the openings, disposed at an opposed second end of said second flange, and means for adjustably securing said rails at least to said first flanges, respectively, so that at least one channel of said first rail is substantially in parallel alignment with a corresponding channel of said second rail in the longitudinal direction.

3. A universal rail system for a vehicle having a bed defined at least in part by a front wall proximate a passenger cab of the vehicle, a tailgate distal from the front wall and a pair of opposed sidewalls extending in a longitudinal direction between the front wall of the vehicle bed and the tailgate thereof, said universal rail system comprising:

at least first and second rails adjustably affixed to a respective one of the sidewalls of the vehicle bed and extending proximate an inner surface of the sidewalls in the longitudinal direction between the front wall of the vehicle bed and the tailgate thereof, said rails each including at least one elongate channel extending along a longitudinal direction thereof, and mounting means associated with each said rail for adjustably affixing said rails to the sidewalls of the vehicle bed, said mounting means being adapted to cooperate with said rails to adjustably compensate for a predetermined intentional degree of taper by which the sidewalls deviate from a substantially parallel alignment position along the longitudinal direction between the front wall of the vehicle bed and the tailgate thereof, so that said rails have a substantially parallel relationship with respect to one another in the longitudinal direction within the vehicle bed;

wherein said mounting means comprises adjustable fastening means, said adjustable fastening means including a bracket member comprising a first member extending from a first end thereof toward a distal end thereof adjacent the inner surface of the sidewalls, a flange disposed at said distal end of said first member and extending away from said first member toward an interior portion of the vehicle bed, means for adjustably securing said rails to said flanges, respectively, so that at least one channel of said first rail is substantially in parallel alignment with a corresponding channel of said second rail in the longitudinal direction, and means for engaging an opening in an uppermost surface of the sidewalls of the vehicle bed comprising a clip appendage extending from said first end of said first member of said bracket member.

4. The universal rail system according to claim 1, wherein at least one of said elongate channels of each said rail includes an opening disposed to face the interior portion of the vehicle bed.

5. The universal rail system according to claim 1, wherein said first and said second rails each comprise a plurality of rail sections.

6. The universal rail system according to claim 5, further comprising at least one rail extension member disposed in conjunction with said rail sections.

7. The universal rail system according to claim 1, wherein said means for adjustably securing each said rail to a respective one of said flanges of said bracket member comprises:

an elongated opening formed in said flange and extending a distance along a length direction of said flange;

at least one fastening member extending from said rail that passes through said elongated opening in said flange; and a corresponding fastening member configured to securely mate with said fastening member to achieve a secure relationship between said rail and said flange of said bracket member in a plurality of different positions within said elongated opening along the length direction of said flange.

8. The universal rail system according to claim 7, wherein said means for adjustably securing said rails to said flanges further comprises an auxiliary bracket having at least a flange member and a clip portion.

9. The universal rail system according to claim 8, wherein said flange member of said auxiliary bracket comprises an elongated opening formed therein and extending a distance along a length direction thereof.

10. The universal rail system according to claim 9, wherein said at least one fastening member passes through said elongated opening in said flange member of said auxiliary bracket.

11. The universal rail system according to claim 2, wherein said first end of said first member of said bracket member is situated proximate an upper portion of the respective sidewalls of the vehicle bed.

\* \* \* \* \*